UNITED STATES PATENT OFFICE.

ISAAC ADAMS, JR., OF BOSTON, MASSACHUSETTS.

IMPROVEMENT IN NICKEL-PLATING.

Specification forming part of Letters Patent No. 116,658, dated July 4, 1871.

*To all whom it may concern:*

Be it known that I, ISAAC ADAMS, Jr., of Boston, in the State of Massachusetts, have invented a new and useful improvement in the process of making the double sulphate of nickel and ammonia.

My improvement relates to the manufacture of that salt by the battery process, so called; and consists in heating the solution of sulphate of ammonia, in which the nickel is dissolved, while the electric current is passing through it.

In carrying out my invention I use a plate of nickel as an anode connected with the positive pole of the battery in a solution of sulphate of ammonia in water. The cathode connected with the zinc pole I place in the same solution, and I prefer to surround it with a porous cup, which shall prevent the ammonia liberated upon it from being diffused through the whole mass of the solution. The arrangements thus far are the same as those which may be employed in making the double salt at ordinary temperatures; but in addition to these I add some means for heating the solution and keeping it at a temperature of about 150° Fahrenheit. I consider this temperature the most preferable one, but it may be varied considerably. The heat may be applied directly by a fire under it, or by a gas-flame; but I prefer to surround the vessel with a steam or hot-water jacket, as a uniform temperature can be thus maintained very easily and cheaply. The double salt, when formed in the solution, may be in crystals by cooling.

The advantages secured by heating the solution are: 1st, that the solution is a better conductor of electricity when hot, and attacks the nickel more freely. 2d, it is capable of holding a larger amount of the double salt in solution, and, as a wider range of temperature for cooling is obtained, a much larger amount of crystals may be obtained from a given amount of solution. 3d, practically, the nickel dissolved is the full equivalent of the electrical current employed. 4th, a more impure nickel may be employed, and, at the same time, a purer double salt is obtained, as the iron usually found in commercial nickel is, to a large extent, converted into an insoluble compound and eliminated.

What I claim as my invention is—

The application of heat to the solution of sulphate of ammonia in forming the double sulphate of nickel and ammonia by the battery process, substantially as herein described.

ISAAC ADAMS, JR.

Witnesses:
CHAUNCEY SMITH,
WILLIAM W. SWAN.